G. CHRISTENSON.
SLACK TAKE-UP FOR FLUID PRESSURE BRAKE SYSTEMS.
APPLICATION FILED AUG. 3, 1916.
1,251,642.
Patented Jan. 1, 1918.
2 SHEETS—SHEET 1.
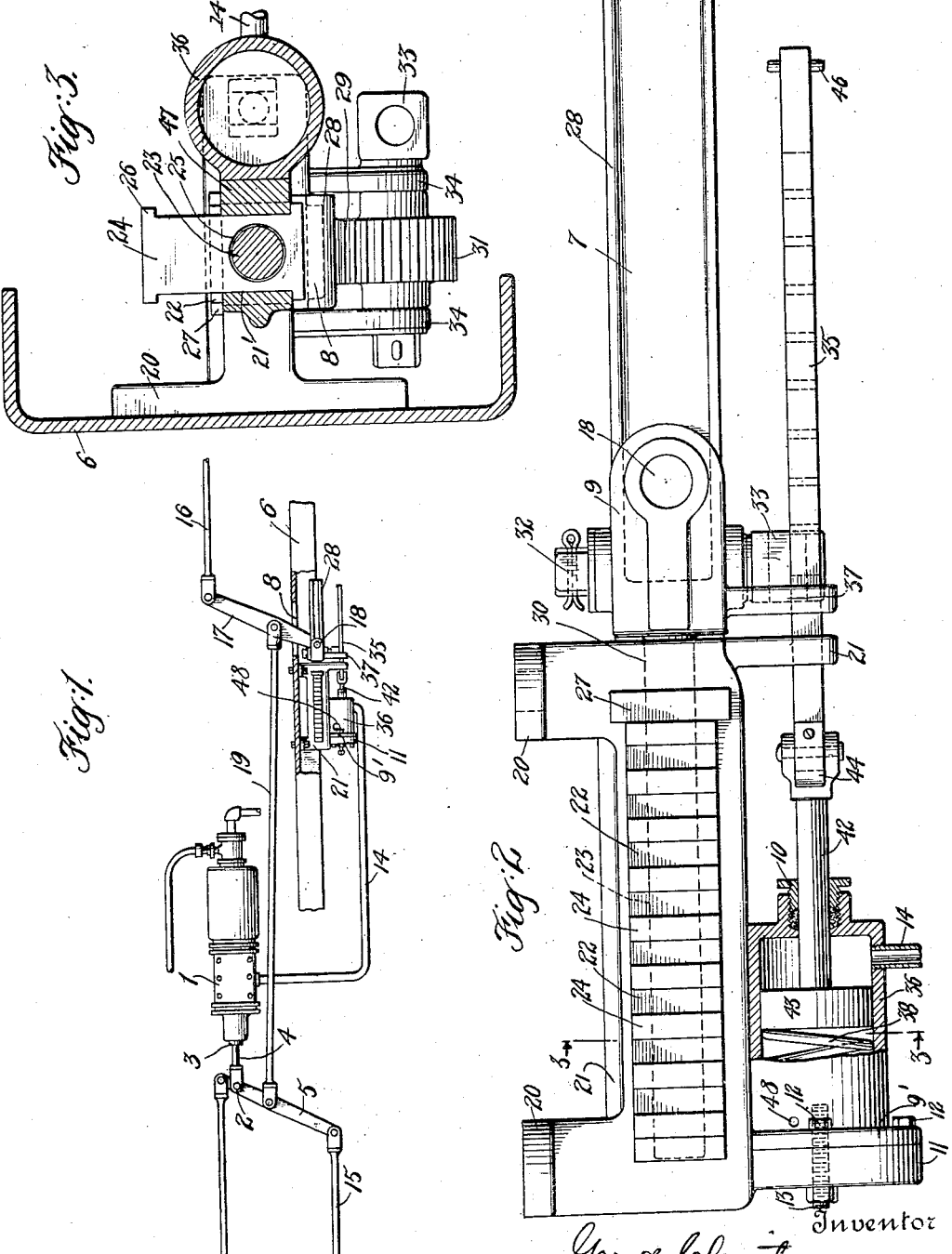
Inventor
George Christenson
By his Attorney G. CHRISTENSON.
SLACK TAKE-UP FOR FLUID PRESSURE BRAKE SYSTEMS.
APPLICATION FILED AUG. 3, 1916.
1,251,642.
Patented Jan. 1, 1918.
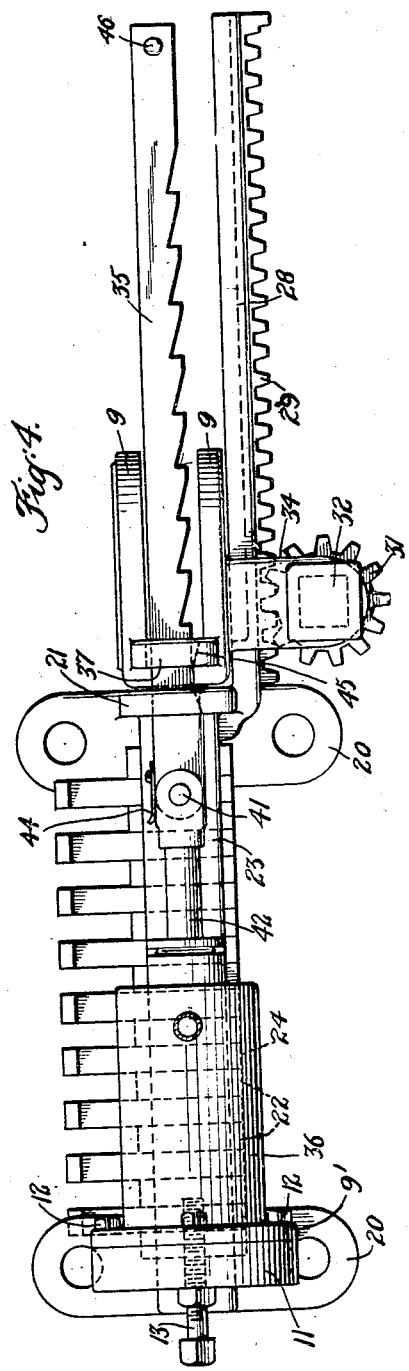
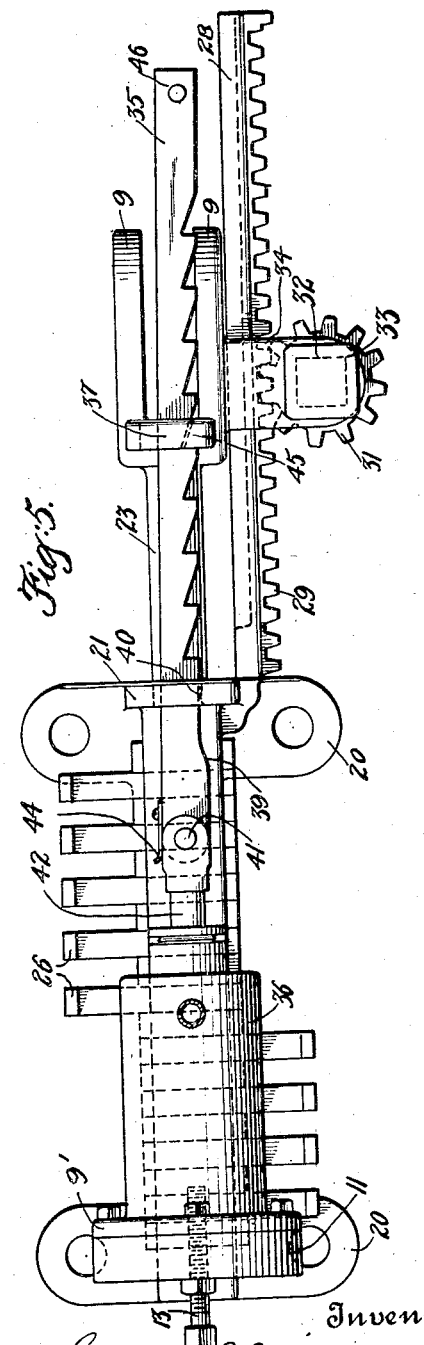
Inventor
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

SLACK-TAKE-UP FOR FLUID-PRESSURE BRAKE SYSTEMS.

1,251,642.      Specification of Letters Patent.      Patented Jan. 1, 1918.

Application filed August 3, 1916. Serial No. 113,017.

*To all whom it may concern:*

Be it known that I, GEORGE CHRISTENSON, a citizen of the United States of America, residing at Jamaica, county of Queens, State of New York, have invented certain new and useful Improvements in Slack-Take-Ups for Fluid-Pressure Brake Systems, of which the following is a specification.

My invention relates to fluid pressure brake systems and comprises a modification of the particular form of apparatus embodying the general invention described and shown in my pending application Serial No. 110,802, filed July 22, 1916. In said prior application mechanism for both manually and automatically taking up the slack in the brake rigging and so establishing and maintaining standard piston travel is shown all mounted on the push rod employed in the usual freight brake rigging. In some cases this might be considered too cumbersome and heavy a loading for a moving part. To avoid any such criticism I may mount said apparatus upon the car body and arrange it so that it will adjust the fulcrum of the multiplying lever of the brake rigging. The best form of apparatus at present known to me embodying this modification of my invention is illustrated in the accompanying two sheets of drawings in which, Figure 1 is a plan view of the standard freight brake rigging with my invention attached and parts broken away.

Fig. 2 is a detail plan view on an enlarged scale of the fulcrum adjusting mechanism.

Fig. 3 is a vertical section on line 3—3 of Fig. 2.

Fig. 4 is a side elevation showing the parts in normal position of rest, and

Fig. 5 is a similar view showing the parts in one position assumed during operation of the automatic take-up.

Throughout the drawings like reference characters indicate like parts.

1, is the usual air brake cylinder having piston ( not shown) with hollow piston rod 3, in which is loosely mounted the push rod 4, which is pivoted at 2, to the floating lever 5, of the main brake rigging.

The standard brake rigging is represented by the tension rods 15 and 16, the multiplying lever 17, pivoted to the car body by pin 18, and the tie rod 19, all of standard construction.

The adjustable take-up mechanism comprises an adjustable fulcrum for the multiplying lever 17, that is to say, of means for shifting the position of the pivot pin 18. The mechanism for doing this comprises the slotted shim carrying frame 21, bolted to the center sill 6, of the car body through flanges 20, 20. The lever 17, passes through slot 8, in sill 6. Through a hole 30, in the forward end of the part 21, slides the plunger 23, which has ears 9, 9, at its outer end forming a clevis connection with multiplying lever 17, by means of pin 18. Beyond the slotted part 21, the frame continues further in the shape of an extension 28, preferably on the lower side, parallel to plunger 23, and grooved at 7, on its upper face to receive the end of pin 18, and so serve as a guide for the plunger.

The system of shims consists of two series, one composed of short perforated shims 22, 22, fixed in slot 21, or movable only longitudinally thereof and serving as guides for the inner end of plunger 23, the other composed of a series of longer, perforated shims 24, 24, preferably interleaved or alternating with the short shims. All shims have similar perforations 25, just large enough to admit plunger 23, and all shims, as shown, have transversely extending lugs 26, at their upper and lower ends which engage the sides of slotted frame 21, and limit up and down motion of the shims. The shims 22, are so short that their ears 26, permit no movement transversely of the plunger and their perforations 25, are central thereof. The longer shims 24, are capable of limited vertical motion and have their perforations 25, in their lower parts so that when the shims are up their perforations are in line with opening 30, in the forward end of 21, and consequently in line with plunger 23, but are out of line therewith when the shims are down, both as well shown in Fig. 5.

At the outer end of part 21, there are vertical grooves 47, 47, in its inner side faces in which fits a wide shim or keeper 27, which has no lugs on its lower end. Consequently this keeper can be lifted out, when the plunger 23, is withdrawn, and all the shims 22, and 24, can then be slid along to slots 47, 47, and lifted out, these slots being deep enough to allow lugs 26, on all these shims to pass. A reversal of this operation will load the shim holding frame again with a full set of shims.

The foregoing description sets out in substance a standard freight brake rigging with a special form of mechanism for shifting the fulcrum of the multiplying lever 17, and so taking up slack and adjusting piston travel. This mechanism may be operated in either of two ways, first, by a manually operated device such as one of those shown in my previous Patent No. 1,184,682, and secondly, by an automatic attachment of the general form shown in my pending application No. 110,802.

The preferred form of manually operated device here illustrated is composed of rack teeth 29, on the under side of frame extension 28, a pinion 31, meshing therewith mounted on shaft 32, journaled in ears 34, depending from plunger head 9, and having a capstan head 33.

The preferred form of automatic attachment shown, (though many substitute forms could be easily devised to operate upon the same general principle) is composed of a ratchet bar 35, pivoted at 41, to piston rod 42, projecting from small cylinder 36, mounted beside shim frame 21, by means of bracket 11, on said frame, flange 9', on cylinder 36, and bolts 12, 12. Piston rod 42, passes through a stuffing box 10, to piston 43, and piston rod and ratchet bar are normally forced out by spring 38, behind the piston into position shown in Figs. 2 and 3. A pipe 14, extends from a port in cylinder 36, in front of the normal position of piston 43 (see Fig. 2) to a port in cylinder 1, so located as to be opened by the piston therein when it exceeds the fixed standard of piston travel, say 8 inches. 44 is a light spring on ratchet bar 35, bearing on piston rod 42, and normally forcing the ratchet bar downward so that its teeth will engage any coöperating projection, as 45, on plunger 23. As shown, this projection 45, forms the bottom of the slot in housing 37, for ratchet bar 35, which housing or guide is mounted on the head of plunger 23. This slot is long enough to permit the ratchet bar 35, to move away from plunger 23, far enough to have its teeth disengage from projection 45 (see Fig. 4). 39 is a cam surface on ratchet bar 35, and 40, is a coöperating cam surface on the part 21, the two coöperating to lift the ratchet bar away form projection 45, when the cam faces are forced together by strong spiral piston spring 38, as shown in Fig. 4.

46, is a stop pin or transverse projection from the end of ratchet bar 35, adapted to engage housing 37, and prevent the plunger 23, being pulled out so far as to entirely free itself from the shim holding part 21.

13, is an adjustable stop for limiting the inward movement of piston 43, so that it may move the ratchet bar the distance of only one tooth, or of two or more teeth.

In setting the slack adjuster the parts are manually adjusted by inserting a lever or rod in capstan head 33, and rotating pinion 31 (the brake rigging preferably being first put under tension by an ordinary application of compressed air) to force back push rod 4, until the piston in cylinder 1, is also forced back to the standard point of maximum travel, say eight inches. One of more shims 24, will drop in front of the end of plunger 23, and hold the elements in their new position of adjustment. If, after the train has been out on the road for some time much use of the brakes has worn down the shoes and created an amount of slack such that the piston travels beyond eight inches, pipe 14 will be thrown into communication with the interior of cylinder 1, and full air pressure there existing will pass to take-up cylinder 36, forcing piston 43, inward, compressing spring 38, parting cam surfaces 39 and 40, and allowing ratchet bar 35, to drop onto and drag over projection 45, until one or more teeth get behind said projection, as shown in Fig. 5. When the brakes are next released and the pipe 14, communicates with the atmosphere by reason of backward motion of the piston in cylinder 1, the compressed air in take-up cylinder 36, escapes, spring 38, expands and piston 43, and ratchet bar 35, will move out to normal position, carrying plunger 23, with them until cam surfaces 39, 40, engage and lift the ratchet bar from engagement with 45. By that time one or more shims 24, will have dropped behind plunger 23, and will hold it in its new position of adjustment during subsequent brake applications, thus eliminating the slack, until further wear of brake shoes again permits sufficient excess piston travel to again admit air to pipe 14, and repeat the operation. Fig. 5 shows the parts in the position they have assumed after several such take-up operations. Fig. 4 shows the parts in the position assumed after new brake shoes have been inserted.

In order to prevent any atmospheric air which might otherwise be trapped in cylinder 36, when piston 43, is forced inward, from presenting resistance to such movement, I provide said cylinder with any convenient form of air vent such as opening 48, in the top thereof shown in Figs. 1 and 2.

Having described my invention, I claim:

1. The combination, with a standard brake rigging comprising a multiplying lever fulcrumed on the car and an adjustable fulcrum for said lever, of manually operated means for adjusting the position of said fulcrum while the brake rigging is under tension, and automatically operated means for adjusting said fulcrum when the brakes have been released after an application in which a predetermined amount of piston travel has occurred.

2. The combination, with a standard brake rigging comprising a multiplying lever fulcrumed on the car and an adjustable fulcrum for said lever, of means for adjusting said fulcrum comprising a rack fastened to the car, a pinion meshing with the rack and connected to the fulcrum, and manually operated means for rotating said pinion, together with a plunger and series of coöperating shims for holding said fulcrum in different positions of adjustment.

3. The combination, with a standard brake rigging comprising a multiplying lever fulcrumed on the car and an adjustable fulcrum for said lever, of means for adjusting said fulcrum and maintaining it in adjustment comprising a rack fastened to the car, a pinion meshing with the rack and connected to the fulcrum, manually operated means for rotating said pinion, a plunger and series of coöperating shims for holding said fulcrum in different positions of adjustment, together with a reciprocating ratchet mechanism also adapted to produce said adjustment, a cylinder having a piston connected to said ratchet mechanism and a pipe connecting said cylinder with the brake cylinder and adapted to be thrown into communication with the compressed air in said brake cylinder when the brake piston makes a stroke of predetermined distance.

4. The combination, with a standard brake rigging comprising a multiplying lever fulcrumed on the car and an adjustable fulcrum for said lever, of a frame attached to the car body containing a series of perforated shims capable of vertical movement, a plunger pivoted to the multiplying lever and arranged in line with the perforations of the shims when they are raised but out of line therewith when they are dropped down, a projection on said plunger, a ratchet bar guided on the car body capable of longitudinal reciprocation and engaging said projection, and means automatically operated by excess travel of the brake piston to reciprocate said ratchet bar.

5. As an element of an automatic slack adjuster for railway brakes a ratchet mechanism comprising the combination of a projection on the brake rigging, a reciprocating ratchet bar adapted to engage said projection, guiding means for said ratchet bar permitting longitudinal movement and sufficient lateral movement to free it from such engagement, a take-up cylinder mounted on the car body, a piston in said cylinder connected to the ratchet bar, a spring normally tending to force the piston in one direction, connections for admitting compressed air from the brake cylinder to that end of the take-up cylinder toward which the take-up piston is normally pressed by the spring, and mechanism causing the ratchet bar to engage the projection on the brake rigging when moved in a direction to compress the spring and to free it from engagement upon the completion of the return movement of the ratchet bar.

6. As an element of an automatic slack adjuster for railway brakes a ratchet mechanism comprising the combination of a projection on the brake rigging, a reciprocating ratchet bar adapted to engage said projection, guiding means for said ratchet bar permitting longitudinal movement and sufficient lateral movement to free it from such engagement, a take-up cylinder mounted on the car body, a piston in said cylinder flexibly connected to the ratchet bar, a spring normally tending to force the piston in one direction, connections for admitting compressed air from the brake cylinder to that end of the take-up cylinder toward which the take-up piston is normally pressed by the spring, and mechanism causing the ratchet bar to engage the projection on the brake rigging when moved in a direction to compress the spring and to free it from engagement upon the completion of the return movement of the ratchet bar, said last mentioned mechanism comprising a cam carried by the ratchet bar and a coöperating cam supported on one of the ratchet bar guides.

7. As an element of an automatic slack adjuster for railway brakes a ratchet mechanism comprising the combination of a projection on the brake rigging, a reciprocating ratchet bar adapted to engage said projection, guiding means for said ratchet bar permitting longitudinal movement and sufficient lateral movement to free it from such engagement, a take-up cylinder mounted on the car body, a piston in said cylinder connected to the ratchet bar, a spring normally tending to force the piston in one direction, connections for admitting compressed air from the brake cylinder to that end of the take-up cylinder toward which the take-up piston is normally pressed by the spring, and mechanism causing the ratchet bar to engage the projection on the brake rigging when moved in a direction to compress the spring and to free it from engagement upon the completion of the return movement of the ratchet bar, together with an adjustable stop for limiting the movement of the ratchet bar.

GEORGE CHRISTENSON.

Copies of this patent may be obtained for five cents each, by addressing the "Commissioner of Patents, Washington, D. C."